United States Patent [19]
Cullen

[11] Patent Number: 6,062,204
[45] Date of Patent: May 16, 2000

[54] ENGINE CONTROL SYSTEM AND METHOD WITH ATMOSPHERIC HUMIDITY COMPENSATION

[75] Inventor: Michael John Cullen, Northville, Mich.

[73] Assignee: Ford Global Technologies, Inc., Dearborn, Mich.

[21] Appl. No.: 09/173,334

[22] Filed: Oct. 15, 1998

[51] Int. Cl.[7] .............................. F02M 25/07; F02P 5/15
[52] U.S. Cl. .............................. 123/568.22; 123/406.12; 123/406.55; 123/568.24
[58] Field of Search ................... 123/406.12, 406.49, 123/406.55, 677, 568.11, 568.21, 568.22, 568.24, 406.26; 701/108

[56] References Cited

U.S. PATENT DOCUMENTS

| | | | |
|---|---|---|---|
| 3,969,614 | 7/1976 | Moyer et al. ...................... | 123/568.24 |
| 4,168,683 | 9/1979 | Hata et al. . | |
| 4,171,691 | 10/1979 | Nohira et al. ...................... | 123/568.22 |
| 4,598,684 | 7/1986 | Kato et al. ......................... | 123/568.22 |
| 4,651,700 | 3/1987 | Kobayashi et al. ................. | 123/677 |
| 4,854,287 | 8/1989 | Tomisawa ........................... | 123/677 |
| 5,005,547 | 4/1991 | Suga et al. ......................... | 123/406.26 |
| 5,515,833 | 5/1996 | Cullen et al. . | |
| 5,706,791 | 1/1998 | Mezger et al. ..................... | 123/568.22 |
| 5,735,245 | 4/1998 | Kubesh et al. ..................... | 123/406.55 |
| 5,762,055 | 6/1998 | Yamashita et al. ................. | 123/677 |

*Primary Examiner*—Willis R. Wolfe
*Attorney, Agent, or Firm*—Allan J. Lippa

[57] ABSTRACT

An internal combustion engine includes an exhaust gas recirculation (EGR) mechanism for directing a controlled amount of exhaust gas generated by the engine from the exhaust manifold to an intake manifold of the engine. An electronic engine controller (EEC) controls the EGR by determining a base EGR rate as a function of a plurality of engine operating parameters. The base EGR rate is then modified by a multiplier to compensate the EGR rate for the effect of humidity. The multiplier represents the EGR percent change per grain of humidity deviation from a predetermined humidity level. The EEC further controls the borderline spark timing of the engine by determining a base spark timing as a function of a plurality of engine operating parameters at a predetermined humidity level. The spark rate is then modified by a multiplier to compensate the spark timing for the effect of humidity. The multiplier represents the degree of spark change per grains of humidity possible without incurring engine knock.

20 Claims, 3 Drawing Sheets

6,062,204

ENGINE CONTROL SYSTEM AND METHOD WITH ATMOSPHERIC HUMIDITY COMPENSATION

TECHNICAL FIELD

This invention relates to the field of electronic engine control and more particularly to the field of controlling the exhaust gas recirculation rate and ignition timing in an internal combustion engine in relation to atmospheric humidity.

BACKGROUND

Internal combustion engines typically utilize an exhaust gas recirculation (EGR) system to recirculate a controlled portion of exhaust gas generated by the engine into an intake manifold of the engine in order to provide a reduction in $NO_x$ emissions generated by the engine. Typically, a control mechanism is provided which varies the EGR rate according to one or more sensed conditions such as engine temperature, air charge entering the intake manifold of the engine, and engine speed. High EGR rates are preferable to improve fuel economy and reduce emissions. However, the ability to use relatively high EGR rates is hampered by the effects of humidity. Specifically, high humidity reduces the driveability of engines with high EGR operating schedules.

Similarly, humidity has an effect on borderline spark settings which relate to engine knock. Specifically, humidity reduces the tendency of an internal combustion engine to spark knock by lowering the temperature of the end gases in the combustion chamber. The overall effect is an increase in performance as humidity increases. Engine spark control systems are, thus, typically calibrated for worst case humidity levels, i.e., low humidity.

Accordingly, there is a need for a system which provides an optimum EGR rate at a variety of engine operating ranges and atmospheric humidity levels. Additionally, there is a need for an engine control system which provides optimum borderline spark control at a variety of engine operating ranges and atmospheric humidity levels.

SUMMARY OF THE INVENTION

It is an object of the present invention to provide an exhaust gas recirculation system which accurately determines an exhaust gas recirculation rate over variety of vehicle operating and atmospheric humidity levels.

It is a further object of the present invention to provide an engine spark control system which accurately determines the borderline spark timing over a variety of vehicle operating and atmospheric humidity levels.

In accordance with an object of the invention, a method of controlling the rate of exhaust gas recirculation in an internal combustion engine is performed by generating a rpm value which is indicative of the rotational speed of the engine, generating an air charge value which is indicative of air charge entering an intake manifold of the engine and generating a humidity value which is indicative of the ambient humidity level. A multiplier is calculated as a function of the rpm value and the air charge value. This multiplier represents the EGR percent change per grain of humidity deviation from a standard humidity. A base exhaust gas recirculation rate value is then determined as a function of at least the rpm value and the air charge value. The base exhaust gas recirculation rate is then adjusted by the product of a multiplier and the quantity of a standard humidity less the observed humidity. Thus, the EGR rate is compensated for the effect of atmospheric humidity.

In accordance with another object of the invention, a method of controlling the borderline spark timing of an internal combustion engine is performed by generating a rpm value which is indicative of the rotational speed of the engine, generating an air charge value which is indicative of air charge entering an intake manifold of the engine and generating a humidity valve which is indicative of the ambient humidity level. A multiplier is calculated as a function of the rpm value and air charge value. This multiplier represents the degree of spark change per grain of humidity possible without incurring engine knock. A borderline spark value is then calculated as a function of at least the rpm value and the air charge value. The borderline spark value is then adjusted by the product of multiplier and the observed humidity to compensate the engine spark timing for the effect of humidity.

An advantage of the disclosed embodiments is improved emissions by compensating EGR and spark timing for the effects of humidity with a resulting increase in engine torque and improved driveability.

Other objects and advantages of the present invention will become apparent upon considering the following detailed description and appended claims, and upon reference to the accompanying drawings.

DESCRIPTION OF THE PREFERRED EMBODIMENT(S)

Figure 1:
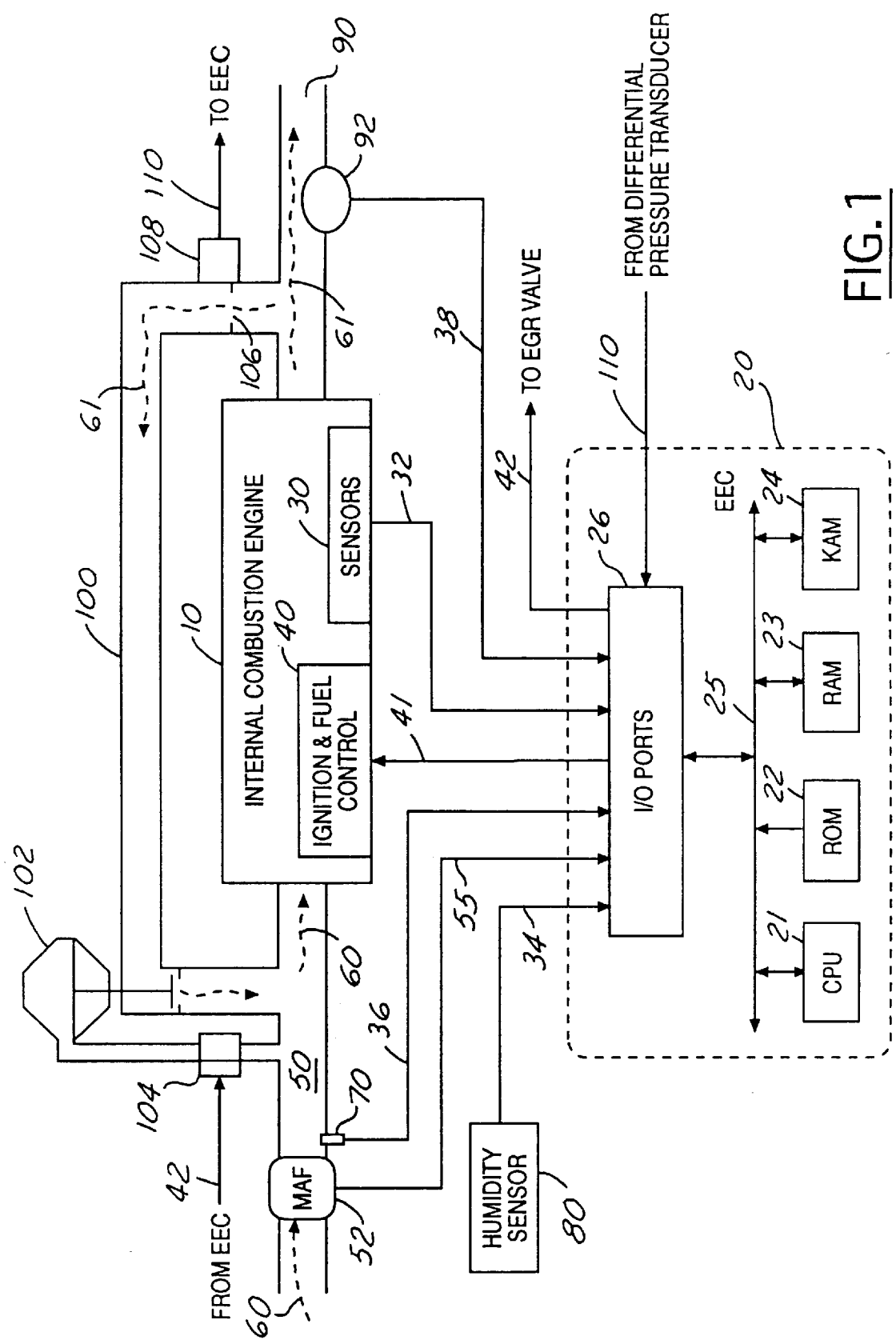
FIG. 1 of the drawings shows a block diagram of a portion of an internal combustion engine and electronic engine controller which embody the principles of the invention.

In FIG. 1 of the drawings, the operation of an internal combustion engine 10 is controlled by an Electronic Engine Controller (EEC) 20 which includes a central processing unit 21, a read-only memory (ROM) 22 for storing control programs, a random-access memory (RAM) 23 for temporary data storage, a keep-alive-memory (KAM) 24 for storing learned values, a conventional data bus 25 and I/O ports 26 for transmitting and receiving signals to and from the engine 10. EEC 20 receives signals from a plurality of sensors, shown generally at 30, which transmit signals containing information indicative of the rotational speed of the engine, the temperature of engine coolant circulating in the engine, the air/fuel ratio and other engine operating parameters to EEC 20 over signal lines shown generally at 32. Each of the sensors 30 are conventional and may take one of several known forms. EEC 20 receives signals 32 along with other signals such as 34, 36 and 38 and generates control signals 41 received by the ignition and fuel control module 40 for controlling spark timing, the rate of fuel delivered to combustion chambers of the engine and other operational functions of the engine.

Engine 10 draws an intake air mixture into intake manifold 50 past a Mass Air Flow (MAF) sensor 52 which detects the mass flow rate of air entering the intake manifold 50 and transmits a MAF signal 55 to EEC 20. Dotted lines 60 indicate the flow of the intake charge entering intake manifold 50. An air temperature sensor 70 detects the temperature of the air charge entering intake manifold 50 and transmits a representative signal 36 to EEC 20. Humidity sensor 80 measures humidity in grains which represents pounds of $H_2O$ per pound of dry air and transmits a representative signal 34 to EEC 20. Sensors 70 and 52 are each conventional.

Exhaust generated from the combustion of an air/fuel mixture within combustion chambers (not shown) of engine 10 travels from the combustion chambers through exhaust manifold 90. Dotted lines 61 indicate the flow of the exhaust gas generated by the engine. A Heated Exhaust Gas Oxygen (HEGO) sensor 92 detects the oxygen content within the exhaust gas and transmits a representative signal 38 to EEC 20.

The engine 10 includes an exhaust gas recirculation (EGR) system for transporting a controlled portion of exhaust gas generated by the engine from an exhaust manifold 90 into intake manifold 50, through an EGR passage 100. The amount of exhaust gas which is recirculated from the exhaust manifold to the intake manifold is controlled by a pneumatically actuated EGR valve 102. EGR valve 102 is connected to a vacuum modulating solenoid 104 which controls the operation of EGR valve 102 in accordance with the EGR rate signal 42 generated by EEC 20. EGR passage 100 includes a metering orifice 106 and a differential pressure transducer 108, which is connected to pressure taps up and downstream of the orifice 106. The transducer 108 transmits a signal 110 which is indicative of the pressure drop across orifice 106.

The foregoing EGR system is commonly known as a differential pressure feedback electronic (PFE) EGR system with electronic vacuum regulation (EVR). In such a system, the position of the EGR valve 102 is a function of the EVR duty cycle wherein the desired EGR rate is translated to a desired pressure across the EGR orifice 106 based on a model of the EGR system. Of course, the sensed or actuator values could also be used directly, without modeling the characteristics of the entire EGR system.

The present invention contemplates that ambient humidity values could also be used to modify a number of alternate EGR systems wherein variables other than EGR rate are used to dictate the desired EGR flow.

Such systems include, but are not limited to, EGR systems driven by: (1) duty cycle for EVR equipped systems with or without feedback, (2) stepper motor steps for stepper motor driven systems with or without feedback, (3) voltage, voltage ratio or current for other electronically driven systems with or without feedback, and (4) EGR percent or EGR mass flow for any of the foregoing systems with a model of the EGR system as an intermediate step in the determination of the alternate output.

Figure 2:
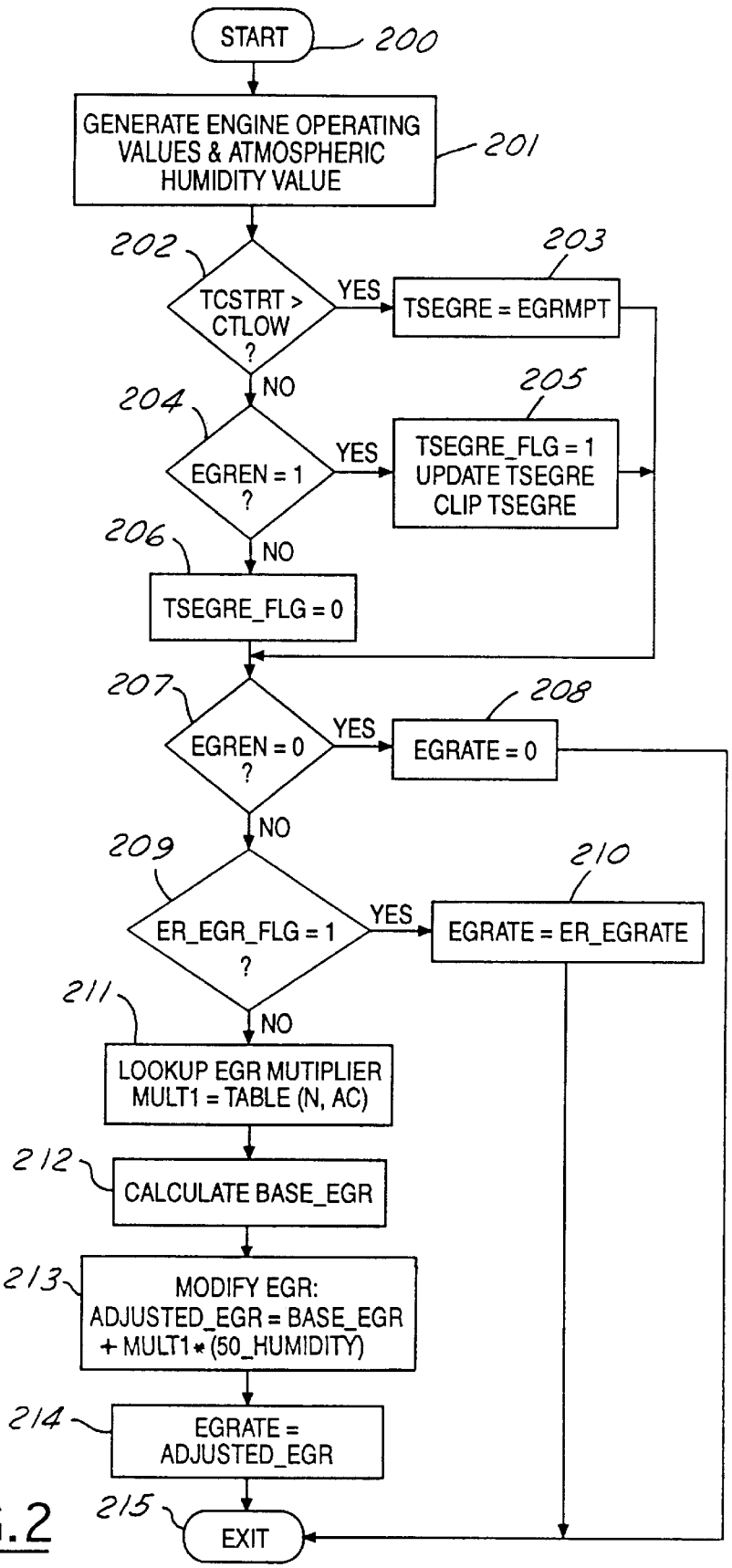
FIG. 2 is a flowchart of the steps executed in an embodiment of the present invention.

Turning now to FIG. 2, the drawing shows the steps taken by an embodiment to implement an EGR rate generation routine to generate the EGR rate signal 42 of FIG. 1. The process described in FIG. 2 advantageously generates EGR rate signal 42 in a manner which compensates for varying humidity levels and provides an optimum EGR rate at a variety of air charge values.

The EGR rate generation routine is performed as a portion of background routine executed by the EEC 20. The background routine executes substantially continuously in the absence of higher priority interrupt routines, the processing of which takes precedence over the background routine. The EGR rate generation routine is initiated at 200 and at step 201, a plurality of engine operational values, including preferably a rpm value indicative of the rotational speed of the engine, an air charge value indicative of the air charge entering the intake manifold of the engine, an air charge temperature value indicative of the temperature of the air charge, a percent load value indicative of engine load, an air/fuel ratio value indicative of the air/fuel ratio, and an engine temperature value indicative of the temperature of engine coolant circulating in the engine are generated along with a humidity value which is indicative of the ambient humidity level are generated for use by the EGR rate generation routine.

Alternatively, other methods may be utilized to determine the temperature of the engine, such as measuring the temperature of the cylinder head. In such a system, the temperature of the cylinder head would be utilized in place of the engine coolant temperature as an indicator of engine temperature.

Humidity levels are measured in grains which equates to pounds of $H_2O$ per pound of dry air. The lowest humidity in North America is experienced in the Southwest at a reading of approximately 10 grains. In contrast, an average humidity reading in the Midwest is approximately 90 grains.

At steps 202–206 the value of a variable TSEGRE which is indicative of an accumulated time, from initialization of the EEC at engine start, for which EGR is enabled, is determined. First, at 202 an initial test is performed to determine if a hot restart of the engine is taking place. Preferably, the actual EGR rate is increased over a period of time from zero EGR to a desired EGR rate in order to enhance engine driveability if the engine temperature is below a predetermined threshold temperature. This function is performed by determining at 202 if a hot restart of the engine has taken place. As will be appreciated by those skilled in the art, the term hot restart is understood to mean the starting of an engine when the engine temperature is sufficiently high, i.e. above a threshold temperature, such that the engine can maintain good combustion stability and air/fuel control in the presence of EGR.

At 202, the hot restart determination is performed by comparing the value TCSTRT which is indicative of the temperature of engine coolant circulating within the engine, to a calibration constant CTLOW which is indicative of a predetermined maximum value of engine coolant. If TCSTRT is greater than CTLOW then a hot restart is determined to have occurred and at 203 variable TSEGRE which contains a value indicative of an accumulated amount of time that EGR has been enabled is set equal to a calibration constant EGRMPT which is a value indicative of time period in which the EGR rate is increased from a value of zero, i.e. no EGR, to a value as determined by an intermediate base exhaust gas recirculation rate value to be described below.

If a hot restart is not detected at 202 then at 204 an EGR enabling flag, EGREN, is checked to determine if EGR is enabled. The flag EGREN preferably has a value of one if EGR is enabled and a value of zero if EGR is disabled. If EGR is found to be enabled at 204 then at 205 an EGR time flag TSEGRE_FLG is set to a value of 1. The flag TSEGRE_FLG advantageously enables or disables the counting of the EGR timer designated as TSEGRE which as explained above counts from a value of zero, at engine start when the EEC is initialized, to a maximum value designated by the constant EGRMPT, which preferably has a value of thirty seconds. When TSEGRE_FLG has a value of one, TSEGRE will be updated, and when TSEGRE_FLG has a value of zero, updating of TSEGRE will be disabled.

Once TSEGRE_FLG is set to a value of one, TSEGRE is updated as a function of a timer value BGTMR which contains a value indicative of an amount of time elapsed between the present execution of the EGR rate generation routine and the prior execution of the EGR rate generation routine. Finally, at 205, once TSEGRE has been updated, it is compared against EGRMPT, and clipped to a value equal to EGRMPT if TSEGRE has been updated to a value which is greater than EGRMPT. The routine then proceeds to step 207.

If EGR is found at 204 to be disabled, then at 206, TSEGRE_FLG is set to a value of zero, and the routine proceeds to step 207 where the EGR enable flag EGREN is checked to determine if EGR is disabled. If EGREN is equal to zero then EGR is determined to be disabled and at 208, an EGR rate value, which is used by EEC 20 to generate EGR rate signal 42 is set to a value of zero. EGR rate value, EGRATE designates increasing EGR rates with increasing values of EGRATE. Thus a value in EGRATE of zero indicates that no exhaust gas will be recirculated from exhaust manifold 90 to intake manifold 50. Once step 208 is executed, the routine is exited at 215.

If at 207, EGR is not found to be disabled, then at 209, an EGR testing flag ER_EGR_FLG is tested to determine if an EGR test mode has been enabled. Preferably, the EGR rate value EGRATE is set to a predetermined rate designated by constant ER_EGRATE at 210 to enable testing of the EGR system. Once step 210 is executed, the routine is exited at step 215.

If the EGR test mode is determined at 209 to be disabled, then EGR rate value EGRATE is determined by executing steps 211, 212, 213, and 214. At 211, a multiplier (MULT1) is retrieved from a lookup table indexed by engine speed (N) and air charge (AC). Values retrieved from the table are indicative of an empirically derived EGR percentage at a predetermined humidity level, such as 50 grains, at a particular engine speed (N) and air charge (AC). At 212, a base open loop EGR value is calculated at the 50 grain standard as a function of a plurality of engine operating parameters as shown in the following relationship:

$$base\_egr = \text{function}(ECT, PCT\_LOAD, N, AC)$$

where,

Function(ECT) is a value retrieved from a table of values indexed by Engine Coolant Temperature (ECT), each of the values being indicative of the ability of the engine to maintain combustion stability and to control air/fuel in the presence of EGR at a particular engine coolant temperature;

Function(PCT_LOAD) is a value retrieved from a table of values indexed by Percent Load (PCT_LOAD), each of the values being indicative of an empirically determined maximum allowable exhaust gas recirculation rate for a particular percent load value. This function acts to limit the base_egr to the lesser of the maximum allowable exhaust gas recirculation rate and the base exhaust gas recirculation rate otherwise achieved as a function of only ECT, N and AC;

Function(N,AC) is a value retrieved from a table of values, indexed by engine speed (N), and air charge (AC). Values retrieved from the table are indicative of an empirically derived EGR percentage value at the 50 grain standard, at a particular engine speed (N), and a particular air charge (AC).

As used in the present specification, the term air charge (AC) is understood to be air charge entering the intake manifold of the engine in pounds per cylinder filling, as sensed by MAF sensor 52.

As used in the present specification, the PCT_LOAD is understood to represent the ratio of the current air charge (AC) to the peak air charge available to the engine at wide open throttle at the current engine speed and humidity level. As will be appreciated by those skilled in the art in view of the present disclosure, the value PCT_LOAD is related to the vacuum existing in the intake manifold. As the value of PCT_LOAD increases, manifold vacuum decreases, and the EGR valve closes due to loss of the manifold vacuum required to keep the EGR valve open. A preferred method for determining PCT_LOAD is described in U.S. Pat. No. 5,029,569 titled Method and Apparatus for Controlling An Internal Combustion Engine, to Culled et al.

As described in the aforesaid patent, the value PCT_LOAD is generated by generating a rpm value indicative of the rotational speed of the engine and generating a throttle position value indicative of the angular position of the throttle. A ROM table, which is indexed by the engine speed and throttle position and which contains values indicative of air charge existing at a predetermined humidity level is accessed twice. First, the peak air charge value at a predetermined humidity level is retrieved from the table, at current engine speed and wide-open throttle. Second, a part-throttle air charge value at a predetermined humidity level is retrieved at current engine speed and current throttle position. Then the value PCT_LOAD is generated as the ratio of the part throttle air charge value and the peak air charge value. As can be seen, atmospheric humidity, either in an inferred or measured form, affects both the peak air charge value and the part air charge value. However, by taking the ratio of the two values, the effects of atmospheric humidity is canceled. The value PCT_LOAD load thus represents the percentage of peak air charge at the current ambient humidity.

At 213, the base_egr value is adjusted to account for the humidity level by the following relationship:

$$adjusted\_egr = base\_egr + MULT1 * (50 - HUMIDITY)$$

At 214, the EGR rate value EGR_RATE is determined by setting it equal to the adjusted EGR value.

Of course, the measured humidity level could modify the EGR rate in a number of alternate ways. For example, the 50 grain standard could be any desired humidity level depending upon the operating environment of the vehicle. Additionally, the adjusted_egr value could be expressed in a number of alternate ways. For instance, $$adjusted\_egr = base\_egr + FN(HUMIDITY)$$

where FN(HUMIDITY) is a non-linear function of the measured humidity level.

Alternatively, $$adjusted\_egr = base\_egr + FN(HUMIDITY) * AN(N,AC)$$

wherein FN(HUMIDITY) and FN(N,AC) are as described above.

Further, $$adjusted\_egr = base\_egr * FN(HUMIDITY)$$

where FN(HUMIDITY) is used as a multiplier instead of an adder to the base_egr rate. These and other arithmatic combinations representing modifications of the EGR rate based on atmospheric humidity are contemplated by the present invention.

Figure 3:
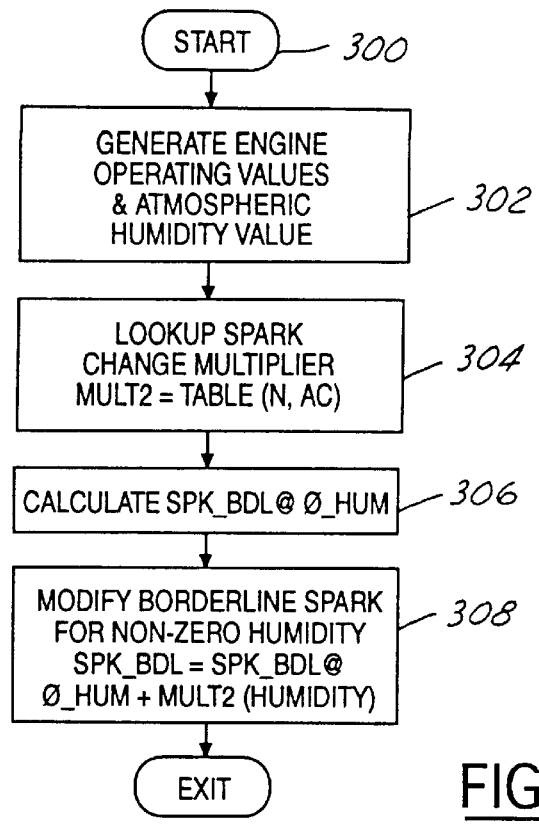
FIG. 3 is a flowchart of the steps executed in another embodiment of the present invention.

Turning now to FIG. 3, the illustration describes the process of adjusting the engine spark timing to account for the effects of humidity. In a typical vehicle engine application, borderline spark is set to operate under worst case humidity conditions (lowest possible humidity). Therefore, under all higher humidity conditions, ignition timing is retarded from that which is possible, resulting in lower torque and degraded driveability and fuel economy. The logic routine described in FIG. 3 adjusts engine borderline spark to account for increased humidity levels.

The borderline spark timing routine is initiated at 300 and at step 302, a plurality of engine operational values, including preferably an rpm value indicative of the rotational speed of the engine, an air charge value indicative of the air charge entering he intake manifold of the engine, an air charge temperature value indicative of the temperature of the air charge, an engine temperature value indicative of the temperature of the engine coolant circulating in the engine, the exhaust gas recirculation rate, and the air/fuel ratio of operating engine are generated along with a humidity value indicative of the ambient humidity level are generated for use by the borderline spark timing routine. Again, the humidity value is measured in grains equating to pounds of $H_2O$ per pound of dry air.

At step 304, a multiplier is retrieved from a lookup table indexed by engine speed (N) and air charge (AC). Values retrieved from the table represent an empirically derived borderline spark value at a particular engine speed (N) and air charge (AC). This multiplier represents the degrees of spark change per grains of humidity possible without incurring engine knock.

At step 306, the open loop borderline spark value is calculated as a function of a plurality of engine operating parameters as shown in the following relationship:

$$SPK\_BDL@0\_HUM = TABLE(N,AC) - FN(ECT) - FN(ECT) + FN(EGR) + FN(A/F)$$

where,

FN(ECT) is a value retrieved from a table of values indexed by Engine Coolant Temperature (ECT), each of the values being indicative of the ability of the engine to maintain combustion stability and prevent engine knock at a particular engine coolant temperature;

FN(ACT) is a value retrieved from a table of values indexed by Air Charge Temperature (ACT), each of the values being indicative of the ability of the engine to maintain combustion stability and prevent engine knock at a particular air charge temperature;

FN(EGR) is a value retrieved from a table of values indexed by Exhaust Gas Recirculation rates (EGR), each of the values being indicative of the ability of the engine to maintain combustion stability and prevent engine knock in the presence of exhaust gas being recirculated at a particular rate;

FN(A/F) is a value retrieved from a table of values indexed by Air/Fuel ratio (A/F), each of the values being indicative of the ability of the engine to maintain combustion stability and prevent engine knock at a particular air/fuel ratio; and TABLE(N,AC) is a value retrieved from a table of values indexed by engine speed (N) and air charge (AC). Values retrieved from the table are indicative of an empirically derived borderline spark timing value at zero grains of humidity, at a particular engine speed and air charge.

Finally, at step 308, the borderline spark at zero grains humidity is adjusted to account for the effects of humidity by the following relationship:

$$SPK\_BDL = SPK\_BDL@0\_HUM + MULT2*(HUMIDITY)$$

As with the case of EGR rates, the measured humidity level can also modify the borderline spark timing in a number of alternative ways. For example, the zero grain standard could be any desired specific humidity level depending upon the operating environment of the vehicle. Additionally, the value of SPK_BDL could be expressed in a number of alternate ways. For instance, $$SPK\_BDL = SPK\_BDL@0\_HUM + FN(HUMIDITY)$$

where FN(HUMIDITY) is a non-linear function of the measured humidity level.

Alternatively, $$SPK\_BDL = SPK\_BDL@0\_HUM + MULT2*FN(HUMIDITY)$$

wherein MULT2 and FN(HUMIDITY) are as described above.

Further, $$SPK\_BDL = SPK\_BDL@0\_HUM* FN(HUMIDITY)$$

where FN(HUMIDITY) is used as a multiplier instead of an adder to the base spark timing. These and other arithmatic combinations representing modifications of borderline spark timing as a function of atmospheric humidity are contemplated by the present invention.

As mentioned above, humidity reduces the tendency of an engine to spark knock by lowering the temperature of the end gases in the combustion chamber of the engine. If the effect of humidity is not considered in an engine spark control strategy, the system must be calibrated for worst case humidity operation. In North America this is equal to approximately 10 grains.

Tests were conducted measuring the increase in performance for a Ford 4.61, 2-valve engine operating over a humidity range of 10 to 90 grains. Adjusting for the humidity changes, borderline spark was advanced by 4.2 degrees, resulting in an increase of 6.2 ft-lb of additional peak torque or an increase of 2.3%.

Figure 4:
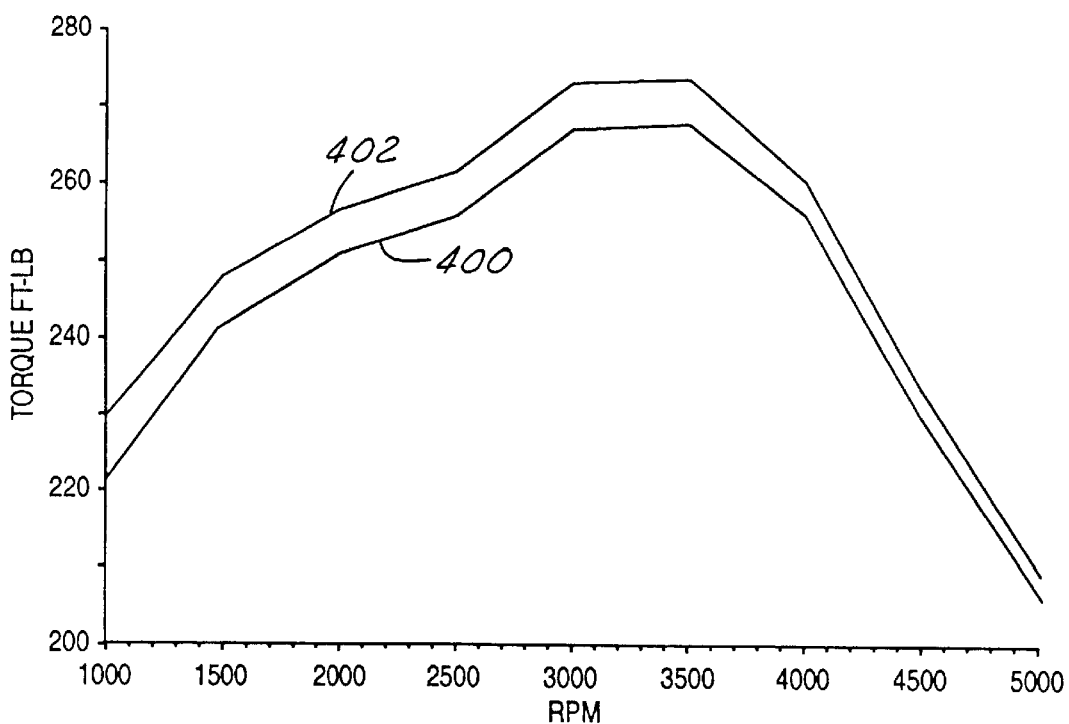
FIG. 4 is a graph showing the relationship of borderline spark and humidity levels to different engine operating parameters.

FIG. 4 represents a plot of engine torque versus rpm at lines of humidity for a Ford 4.61, 2-valve engine. The tests were conducted at an air/fuel ratio of 13:1 and an assumed base dry barometric pressure of 29.42 inches Hg. Line 400 represents 10 grains humidity, or the worst case operating conditions. Line 402 represents 90 grains humidity. The plots demonstrate that a gain of 2.3% (6.1 ft-lb) of peak torque can be achieved when the effects of humidity on spark knock are taken into account as disclosed in the present invention.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A method of controlling the rate of exhaust gas recirculation in an internal combustion engine, comprising the steps of:

generating a rpm value which is indicative of the rotational speed of the engine;

generating an air charge value which is indicative of air charge entering an intake manifold of the engine;

generating a humidity value which is indicative of the ambient humidity level;

determining a base exhaust gas recirculation value as a function of at least the rpm value and the air charge value;

modifying the base exhaust gas recirculation value as a function of the generated humidity value to obtain a modified exhaust gas recirculation value; and regulating the rate of exhaust gas recirculation in response to the modified exhaust gas recirculation value.

2. The method as set forth in claim 1 wherein said step of modifying the base exhaust gas recirculation value further comprises the steps of generating a multiplying factor as a function of at least the rpm value and the air charge value and modifying the base exhaust gas recirculation value by an amount equal to the product of the multiplying factor and the difference between a predetermined humidity value and the generated humidity value.

3. The method as set forth in claim 1 wherein said step of modifying the base exhaust gas recirculation value includes modifying the exhaust gas recirculation value as a non-linear function of the generated humidity value.

4. The method as set forth in claim 1 wherein said step of regulating includes the step of regulating a duty cycle of an electronic vacuum regulation exhaust gas recirculation system.

5. The method as set forth in claim 1 wherein said step of regulating includes the step of regulating a stepper motor of a stepper motor driver exhaust gas recirculation system.

6. The method as set forth in claim 1 wherein said step of regulating includes the step of regulating the amount of power delivered to an electronically driven exhaust gas recirculation system.

7. The method as set forth in claim 1 wherein said step of regulating includes the step of regulating the rate of exhaust gas recirculation as a function of a model of the exhaust gas recirculation system.

8. The method as set forth in claim 1 wherein said step of determining a base exhaust gas recirculation value further comprises the steps of:

generating the base exhaust gas recirculation value as a function of the rpm value, the air charge value, an engine temperature value indicative of the temperature of the engine, and a percent load value indicative of the current air charge to peak air charge available.

9. The method as set forth in claim 8 wherein said step of generating a base exhaust gas recirculation value comprises the steps of:

retrieving a first value from a first table containing a plurality of values indexed by engine temperature;

retrieving a second value from a second table containing a plurality of values indexed by air charge and engine speed;

retrieving a third value from a third table containing a plurality of values indexed by percent load; and generating the base exhaust gas recirculation value as a function of the first, second, and third values.

10. In an internal combustion engine including an exhaust gas recirculation passage for transporting a portion of exhaust gas produced by the engine into an intake manifold of the engine, an exhaust gas recirculation mechanism, responsive to an exhaust gas recirculation signal, for regulating the rate at which exhaust gas is recirculated into the intake manifold, an electronic engine controller for generating the exhaust gas recirculation signal comprising:

a microprocessor programmed to, determine a base exhaust gas recirculation value as a function of a rpm value indicative of the rotational speed of the engine, an air charge value indicative of the air charge entering an intake manifold of the engine, an engine temperature value indicative of the temperature of the engine and a percent load value indicative of the current air charge to peak air charge available;

generate the exhaust gas recirculation signal as a function of the base exhaust gas recirculation value; and transmit the exhaust gas recirculation signal to the exhaust gas recirculation mechanism.

11. An electronic engine controller as set forth in claim 10 wherein the microprocessor determines a base exhaust gas recirculation value by:

retrieving a first value from a first table containing a plurality of values indexed by engine temperature;

retrieving a second value from a second table containing a plurality of values indexed by air charge and engine speed;

retrieving a third value from a third table containing a plurality of values indexed by percent load; and generating the base exhaust gas recirculation value as a function of the first, second, and third values.

12. The method as set forth in claim 11 wherein the engine temperature is determined by measuring the temperature of engine coolant circulating within said engine.

13. The method as set forth in claim 11 wherein the engine temperature is determined by measuring the temperature of the cylinder head of said engine.

14. A method of controlling the ignition timing in an internal combustion engine, comprising the steps of:

generating a rpm value which is indicative of the rotational speed of the engine;

generating an air charge value which is indicative of air charge entering an intake manifold of the engine;

generating a humidity value which is indicative of the ambient humidity level;

determining a borderline spark timing value as a function of at least the rpm value, the air charge value, and a predetermined humidity value;

modifying the borderline spark timing value as a function of the generated humidity value to obtain a modified borderline spark timing value; and regulating the ignition timing of the engine in response to the modified borderline spark timing value.

15. The method as set forth in claim 14 wherein said step of modifying the borderline spark timing value further comprises the steps of generating a multiplying factor as a function of at least the rpm value and the air charge value and modifying the borderline spark timing value by an amount equal to the product of the multiplying factor and the difference between the predetermined humidity value and the generated humidity value.

16. The method as set forth in claim 14 wherein said step of modifying the borderline spark timing value includes modifying the borderline spark timing value as a non-linear function of the generated humidity value.

17. The method as set forth in claim 14 wherein said step of determining a borderline spark timing value further comprises the steps of:

generating the borderline spark timing value as a function of the rpm value, the air charge value, an air charge temperature value indicative of the temperature of the air charge entering the intake manifold of the engine, an engine temperature value indicative of the temperature of the engine, an exhaust gas recirculation value indicative of the exhaust gas recirculation rate of the engine, and an air/fuel value indicative of the air/fuel ratio of the engine.

18. The method as set forth in claim 17 wherein said step of generating a borderline spark timing value comprises the steps of:

retrieving a first value from a first table containing a plurality of values indexed by air charge and engine speed;

retrieving a second value from a second table containing a plurality of values indexed by air charge temperature;

retrieving a third value from a third table containing a plurality of values indexed by engine temperature;

retrieving a fourth value from a fourth table containing a plurality of values indexed by exhaust gas recirculation rates;

retrieving a fifth value from a fifth table containing a plurality of values indexed by engine air/fuel ratio; and generating the borderline spark timing value as a function of the first, second, third, fourth, and fifth values.

19. The method as set forth in claim 18 wherein the engine temperature is determined by measuring the temperature of engine coolant circulating within said engine.

20. The method as set forth in claim 18 wherein the engine temperature is determined by measuring the temperature of the cylinder head of said engine.

* * * * *